United States Patent
Cho et al.

(10) Patent No.: US 10,559,818 B2
(45) Date of Patent: Feb. 11, 2020

(54) NEGATIVE ELECTRODE FOR RECHARGEABLE LITHIUM BATTERY, AND RECHARGEABLE LITHIUM BATTERY INCLUDING SAME

(71) Applicant: SAMSUNG SDI CO., LTD., Yongin-si, Gyeonggi-do (KR)

(72) Inventors: Hyunuk Cho, Yongin-si (KR); Byoung Dong Kim, Yongin-si (KR); Eun Jung Kim, Yongin-si (KR); Sujin Um, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 115 days.

(21) Appl. No.: 15/659,518

(22) Filed: Jul. 25, 2017

(65) Prior Publication Data

US 2018/0034047 A1 Feb. 1, 2018

(30) Foreign Application Priority Data

Jul. 28, 2016 (KR) ........................ 10-2016-0096280

(51) Int. Cl.
 *H01M 4/38* (2006.01)
 *C08K 3/34* (2006.01)
 *H01M 4/62* (2006.01)
 *H01M 10/0525* (2010.01)
 *H01M 2/26* (2006.01)

(52) U.S. Cl.
 CPC ............ *H01M 4/386* (2013.01); *C08K 3/346* (2013.01); *H01M 4/622* (2013.01); *H01M 10/0525* (2013.01); *H01M 2/263* (2013.01)

(58) Field of Classification Search
 CPC .. H01M 4/386; H01M 4/622; H01M 10/0525; H01M 4/387; H01M 10/052; H01M 2/266; H01M 2/263; C08K 3/346
 USPC ........................................................ 429/218.1
 See application file for complete search history.

(56) References Cited

U.S. PATENT DOCUMENTS

| | | | |
|---|---|---|---|
| 2008/0063939 | A1 | 3/2008 | Ryu et al. |
| 2013/0157126 | A1* | 6/2013 | Sulaiman Lo ...... H01M 10/052 429/211 |
| 2015/0099185 | A1* | 4/2015 | Joo ........................ D01D 5/003 429/231.8 |
| 2016/0064715 | A1* | 3/2016 | Honda .................... H01M 2/18 429/145 |

FOREIGN PATENT DOCUMENTS

| | | |
|---|---|---|
| JP | 2004-296370 | 10/2004 |
| KR | 10-0927246 | 11/2009 |
| KR | 10-2011-0041448 | 4/2011 |
| KR | 10-2013-0005876 | 1/2013 |

* cited by examiner

*Primary Examiner* — Gary D Harris
(74) *Attorney, Agent, or Firm* — Lewis Roca Rothgerber Christie LLP

(57) ABSTRACT

A negative electrode for a rechargeable lithium battery and a rechargeable lithium battery including the same. The negative electrode for a rechargeable lithium battery includes a negative active material layer including a negative active material including a Si-based active material; nanoclay; and an aqueous binder; and a current collector supporting the negative active material layer.

12 Claims, 1 Drawing Sheet

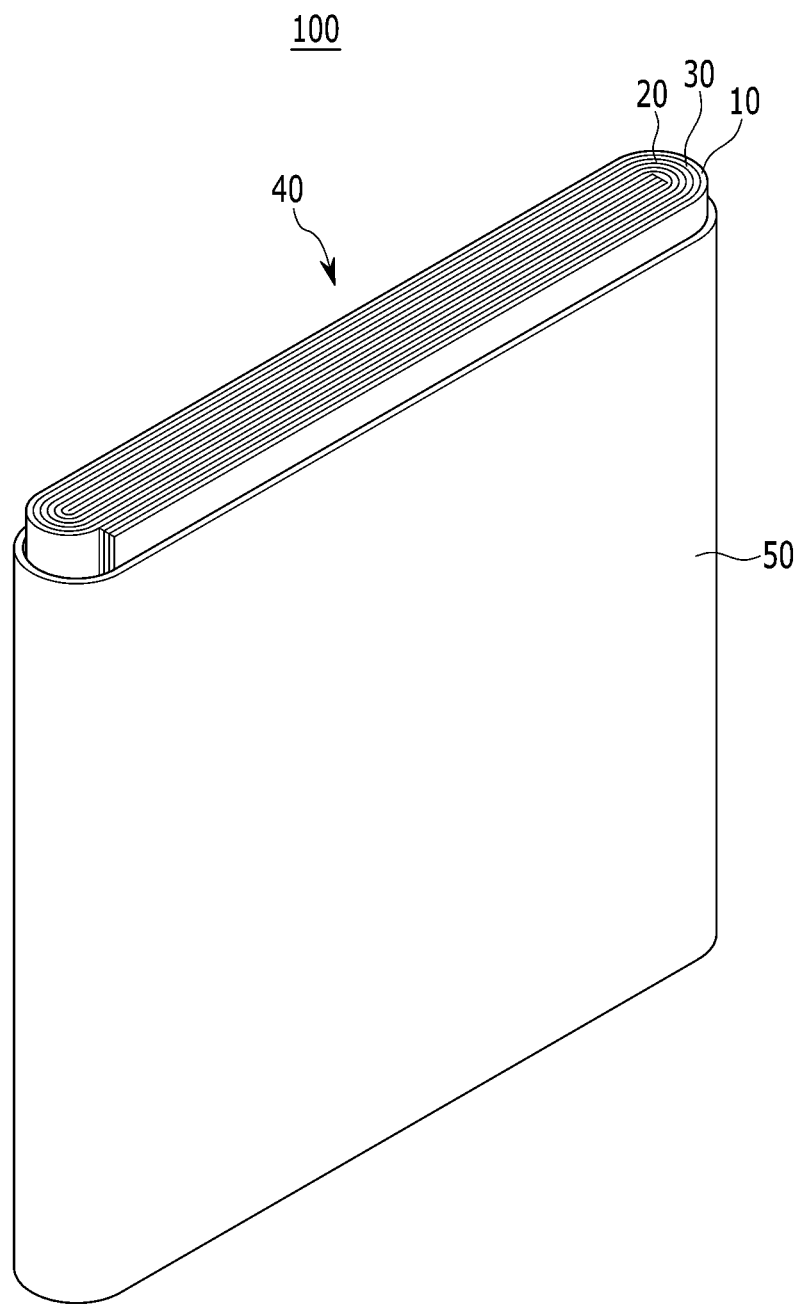

NEGATIVE ELECTRODE FOR RECHARGEABLE LITHIUM BATTERY, AND RECHARGEABLE LITHIUM BATTERY INCLUDING SAME

CROSS-REFERENCE TO RELATED APPLICATIONS

This application claims priority to and the benefit of Korean Patent Application No. 10-2016-0096280 filed in the Korean Intellectual Property Office on Jul. 28, 2016, the entire content of which is incorporated herein by reference.

BACKGROUND

1. Field

One or more aspects of embodiments of the present disclosure are related to a negative electrode for a rechargeable lithium battery, and a rechargeable lithium battery including the same.

2. Description of the Related Art

Rechargeable lithium batteries have recently drawn attention as power sources for small portable electronic devices. Rechargeable lithium batteries include organic electrolyte solutions, and thereby have discharge voltages that are two or more times higher than batteries using alkali aqueous electrolyte solutions. Accordingly, rechargeable lithium batteries have high energy densities. Lithium-transition metal oxides having a structure capable of intercalating lithium ions (such as $LiCoO_2$, $LiMn_2O_4$, $LiNi_{1-x}Co_xO_2$ ($0<x<1$), and/or the like) have been used as positive active materials, and various carbon-based materials (such as artificial graphite, natural graphite, hard carbon, and/or the like) have been used as negative active materials for rechargeable lithium batteries. Recently, non-carbon-based negative active materials (such as silicon and tin) have been researched in hopes of obtaining higher battery capacities.

SUMMARY

One or more aspects of embodiments of the present disclosure provide a negative electrode for a rechargeable lithium battery having improved battery performance, including improved cycle-life characteristics and high stability, due to improved thermal stability and conductivity in accordance with improvement of the mechanical strength of a negative active material layer.

One or more aspects of embodiments of the present disclosure provide a rechargeable lithium battery including a negative electrode having improved battery performance.

One or more aspects of embodiments of the present disclosure provide a negative electrode for a rechargeable lithium battery including: a negative active material layer including a negative active material including a Si-based active material; nanoclay; and an aqueous binder; and a current collector supporting the negative active material layer.

The negative active material layer may further include a carbon-based active material, wherein a weight ratio of the Si-based active material to the carbon-based active material may be about 1:99 to about 99:1.

When the negative active material further includes a carbon-based active material, an amount of the negative active material may be about 82 wt % to about 99.7 wt % based on the total amount (100 wt %) of the negative active material layer.

An amount of the nanoclay may be about 0.1 wt % to about 5 wt % based on the total amount (100 wt %) of the negative active material layer.

An amount of the aqueous binder may be about 0.1 wt % to about 10 wt % based on the total amount (100 wt %) of the negative active material layer.

The nanoclay may be exfoliated into a nano phase in the negative active material layer.

The nanoclay may include montmorillonite, smectite, bentonite, laponite, hectorite, gibbsite, chlorite, kaolinite, halloysite, pyrophylite talc, vermiculite, illite, mica, brittle mica, or a combination thereof.

The aqueous binder may include a styrene-butadiene rubber, an acrylated styrene-butadiene rubber (SBR), an acrylonitrile-butadiene rubber, an acrylic rubber, a butyl rubber, a fluorine rubber, polytetrafluoroethylene, polyethylene, polypropylene, an ethylenepropylene copolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, or a combination thereof.

The nanoclay may have a thickness of about 1 nm to about 10 nm and a diameter of 100 nm to about 1000 nm.

One or more aspects of embodiments of the present disclosure provide a rechargeable lithium battery including the negative electrode; a positive electrode including a positive active material; and an electrolyte.

Other embodiments are included in the following detailed description.

A negative electrode for a rechargeable lithium battery according to an embodiment of the present disclosure provides a rechargeable lithium battery having improved battery characteristics, including improved cycle-life characteristics and stability.

BRIEF DESCRIPTION OF THE DRAWING

The accompanying drawing, together with the specification, illustrates embodiments of the subject matter of the present disclosure, and, together with the description, serve to explain principles of embodiments of the subject matter of the present disclosure.

The accompanying drawing is a schematic view showing a structure of a rechargeable lithium battery including the positive active material according to an embodiment of the present disclosure.

DETAILED DESCRIPTION

The present disclosure will be described more fully hereinafter with reference to the accompanying drawing, in which example embodiments of the disclosure are shown. As those skilled in the art would realize, the described embodiments may be modified in various different ways, all without departing from the spirit or scope of the present disclosure.

In the accompanying drawing, the thickness of layers, films, panels, regions, etc., may be exaggerated for clarity. Like reference numerals designate like elements throughout the specification, and duplicative descriptions may not be provided. It will be understood that when an element such as a layer, film, region, or substrate is referred to as being "on"

another element, it can be directly on the other element or intervening element(s) may also be present. In contrast, when an element is referred to as being "directly on" another element, no intervening elements are present.

A negative electrode for a rechargeable lithium battery according to an embodiment of the present disclosure includes a negative active material layer including a negative active material including a Si-based active material; nanoclay; and an aqueous binder; and a current collector supporting the negative active material layer.

The Si-based active material may be Si, a Si—C composite, $SiO_x$ (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and a combination thereof), or a combination thereof. At least one of these materials may be mixed with $SiO_2$. The element Q may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), and a combination thereof.

The negative active material layer may further include a carbon-based active material, wherein a weight ratio (e.g., a mixing weight ratio) of the Si-based active material to the carbon-based active material may be about 1:99 to about 99:1. In some embodiments, the weight ratio (e.g., the mixing weight ratio) of the Si-based active material to the carbon-based active material may be about 40:60 to about 99:1. When the Si-based active material and the carbon-based active material are mixed to be within the above weight ratio range, battery capacity may be further improved. When the Si-based active material and the carbon-based active material are mixed to a weight ratio of about 40:60 to about 99:1 by increasing the amount of the Si-based active material, a battery having high-capacity may be obtained.

When the negative active material layer (e.g., the negative active material) further includes the carbon-based active material, the negative active material (e.g., the Si-based active material and the carbon-based active material) may be used in a weight of about 82 wt % to about 99.7 wt % based on the total weight of the negative active material layer. When the negative active material is used within the above weight range, a battery with increased capacity may be provided. In some embodiments, volume expansion of the Si-based active material in the negative electrode may be suppressed by the aqueous binder including nanoclay.

The carbon-based active material may include crystalline carbon, amorphous carbon, or a combination thereof. Non-limiting examples of the crystalline carbon may include graphite (such as shapeless, sheet-shaped, flake-shaped, spherical, and/or fiber-shaped natural and/or artificial graphite), and non-limiting examples of the amorphous carbon may include soft carbon or hard carbon, a mesophase pitch carbonized product, fired coke, and the like.

The nanoclay may play the role of a filler among (e.g., between) molecular chains of the aqueous binder, and may reduce shape deformation of molecular chains of the binder first formed on an electrode, thus preventing or reducing a decrease in binding force due to deterioration (e.g., deterioration or reduction of intermolecular attractive forces) between the negative active material and the aqueous binder, thereby decreasing the chances of delamination or detachment from the current collector. Accordingly, the use of the nanoclay may improve the cycle-life characteristics of the battery. In some embodiments, when the nanoclay is used for a negative electrode subject to large volume changes (e.g., on charging and discharging), the mechanical strength of the electrode may be increased, and thus the heat resistance of the battery may be increased, thereby providing a battery having excellent durability and high temperature performance.

An amount of the nanoclay may be about 0.1 wt % to about 5 wt % based on the total amount (100 wt %) of the negative active material layer. When the nanoclay is used in an amount outside of the above range, an excessive concentration of filler particles may be present among the aqueous binder molecular chains so that additional filler particles that are not properly or suitably bound among the chains may be present as a simple resistant (e.g., increase the resistance of the battery), hinder uniformity of the binder molecular chains, and thus not perform a basic function of improving fluidity, adherence, and the like.

The nanoclay may be layered silicate (e.g., silicate having a structure that at least two plates are laminated). In some embodiments, the layered structure of the nanoclay may be exfoliated into a nano phase and present in the negative active material layer, or not completely exfoliated but gapped so that the binder molecule chains are intercalated between the gapped layers.

The nanoclay may include montmorillonite, smectite, bentonite, laponite, hectorite, gibbsite, chlorite, kaolinite, halloysite, pyrophylite talc, vermiculite, illite, mica, brittle mica, or a combination thereof.

Particles of the nanoclay may have a thickness of about 1 nm to about 10 nm and a diameter of about 100 nm to about 1000 nm. Since the particles have at least one laminated layer that forms the nanoclay, the laminated length is defined as a thickness (e.g., the thickness of the at least one laminated layer is defined as the thickness of the particle), and the length of one layer (that is, one surface) is defined as a diameter (e.g., the length across a surface of a laminated layer is defined as a diameter of the particle). The ratio of the thickness to the diameter may be about 1:50 to about 1:1000. The particle may have a specific surface area of about 500 $m^2/g$ to about 1000 $m^2/g$. When the nanoclay particle has a thickness, diameter, ratio of the thickness to the diameter, and surface area outside of the above ranges, characteristics of the nanoclay may not be observed.

An amount of the aqueous binder may be about 0.1 wt % to about 10 wt % based on the total amount (100 wt %) of the negative active material layer. When the aqueous binder is used within the above range for preparing a negative electrode, the negative active material may be more excessively used (e.g., a larger proportion of the negative active material may be deposited), and thus battery capacity may be more increased. In some embodiments, since the nanoclay is hydrophilic and thus more easily reacts with (e.g., is more attracted to) a binder using an aqueous solvent than an organic solvent, the aqueous binder may be appropriate or suitable for dispersion.

The aqueous binder may be a styrene-butadiene rubber, an acrylated styrene-butadiene rubber (SBR), an acrylonitrile-butadiene rubber, an acrylic rubber, a butyl rubber, a fluorine rubber, polytetrafluoroethylene, polyethylene, polypropylene, an ethylenepropylene copolymer, polyethyleneoxide, polyvinylpyrrolidone, polyepichlorohydrin, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, or a combination thereof. As used herein, the term "aqueous binder" may refer to a binder provided in water, and/or a binder material that is stably soluble or suspended in water.

The negative active material layer may further include a cellulose-based compound as a thickener in order to increase its viscosity. The cellulose-based compound may include one or more of carboxylmethyl cellulose, hydroxypropylmethyl cellulose, methyl cellulose, or alkali metal salts thereof. The alkali metal may be sodium (Na), potassium (K), or lithium (Li). Such a thickener may be included in an amount of about 0.1 parts by weight (0.1 wt %) to about 3 parts by weight (3 wt %) based on 100 parts by weight (100 wt %) of the negative active material.

The negative active material layer may further include a conductive material. The conductive material is included to provide electrode conductivity. Any electrically conductive material may be used as a conductive material unless it causes a chemical change. Non-limiting examples of the conductive material may include a carbon-based material (such as natural graphite, artificial graphite, carbon black, acetylene black, Ketjenblack, a carbon fiber, and/or the like); a metal-based material such as a metal powder and/or a metal fiber including copper, nickel, aluminum, silver, and/or the like; a conductive polymer (such as a polyphenylene derivative); or a mixture thereof.

The current collector may include a copper foil, a nickel foil, a stainless steel foil, a titanium foil, a nickel foam, a copper foam, a polymer substrate coated with a conductive metal, or a combination thereof.

A negative electrode according to an embodiment of the present disclosure may be manufactured by mixing a negative active material, nanoclay, an aqueous binder, and optionally a conductive material in a solvent to prepare a negative active material composition, coating the negative active material composition on a current collector, drying the negative active material composition, and compressing the resultant. The solvent may be water.

When the aqueous binder and the nanoclay are mixed, the molecular chains of the binder may be inserted between layers of the nanoclay and may introduce gaps between the layers, such that the nanoclay may be exfoliated and dispersed in the negative active material composition and thus diffused in a negative active material layer formed of the negative active material composition.

A rechargeable lithium battery according to another embodiment of the present disclosure includes the negative electrode, a positive electrode, and an electrolyte.

The positive electrode may include a positive current collector and a positive active material layer formed on the positive current collector. The positive active material may include lithiated intercalation compounds that reversibly intercalate and deintercalate lithium ions. For example, one or more composite oxides of a metal selected from cobalt, manganese, nickel, and a combination thereof, and lithium may be used. For example, a compound represented by one of the following chemical formulae may be used:
$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_{(d)}O_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_{(e)}O_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In the above chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed using a method having substantially no adverse influence on properties of a positive active material by using these elements in the compound. For example, the method may include any suitable coating method available in the art, such as spray coating, dipping, and the like.

In the positive electrode, an amount of the positive active material may be about 90 wt % to about 98 wt % based on the total weight of the positive active material layer.

In some embodiments, the positive active material layer may include a binder and a conductive material. Herein, the binder and the conductive material may be included in an amount of about 1 wt % to about 5 wt %, respectively, based on the total amount of the positive active material layer.

The binder improves the binding properties of the positive active material particles with one another and with a current collector. Non-limiting examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene-butadiene rubber, an epoxy resin, nylon, and the like.

The conductive material is included to provide electrode conductivity. Any electrically conductive material may be used as a conductive material unless it causes a chemical change. Non-limiting examples of the conductive material include a carbon-based material (such as natural graphite, artificial graphite, carbon black, acetylene black, Ketjenblack, a carbon fiber, and/or the like); a metal-based material of a metal powder or a metal fiber including copper, nickel, aluminum, silver, and/or the like; a conductive polymer (such as a polyphenylene derivative); or a mixture thereof.

The current collector may use Al, but is not limited thereto.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent includes cyclohexanone, and the like. The alcohol-based solvent include ethyl alcohol, isopropyl alcohol, and the like, and non-limiting examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable or suitable battery performance.

The carbonate-based solvent may include a mixture of a cyclic carbonate and a linear carbonate. The cyclic carbonate and linear carbonate may be mixed together in (e.g., to) a volume ratio of about 1:1 to about 1:9. When the mixture is used as an electrolyte, it may have enhanced performance.

The organic solvent may further include an aromatic hydrocarbon-based solvent as well as the carbonate-based solvent. The carbonate-based solvent and aromatic hydrocarbon-based solvent may be mixed together in (e.g., to) a volume ratio of about 1:1 to about 30:1.

The aromatic hydrocarbon-based organic solvent may be an aromatic hydrocarbon-based compound represented by Chemical Formula 1:

Chemical Formula 1

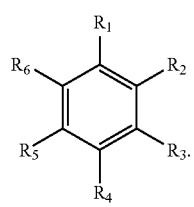

In Chemical Formula 1, $R_1$ to $R_6$ may be the same or different and may each independently be selected from a hydrogen atom, a halogen, a C1 to C10 alkyl group, a haloalkyl group, and a combination thereof.

Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 as an additive for improving cycle-life:

Chemical Formula 2

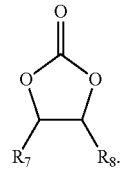

In Chemical Formula 2, $R_7$ and $R_8$ are the same or different and may each independently be selected from a hydrogen atom, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously a hydrogen atom.

Non-limiting examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be flexibly used within an appropriate or suitable range.

The lithium salt dissolved in an organic solvent supplies a battery with additional lithium ions, enables operation of the rechargeable lithium battery, and improves transportation of lithium ions between the positive and negative electrodes. Non-limiting examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on the type or kind (e.g., structure) of battery. Non-limiting examples of a suitable separator material include polyethylene, polypropylene, polyvinylidene fluoride, and multi-layers thereof (such as a polyethylene/ polypropylene double-layered separator, a polyethylene/ polypropylene/polyethylene triple-layered separator, a polypropylene/polyethylene/polypropylene triple-layered separator, and the like).

The accompanying drawing is an exploded perspective view showing a rechargeable lithium battery according to an embodiment of the present disclosure. The rechargeable lithium battery according to an embodiment of the present disclosure is illustrated as a prismatic battery but is not limited thereto and may include variously-shaped batteries (such as a cylindrical battery, a pouch battery, and the like).

Referring to the accompanying drawing, a rechargeable lithium battery 100 according to an embodiment of the present disclosure includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

Hereinafter, examples of the present disclosure and comparative examples are described. These examples, however, are not in any sense to be interpreted as limiting the scope of the disclosure.

Example 1

1.2 wt % of styrene-butadiene rubber was added to water and dissolved therein. 0.3 wt % of montmorillonite having a thickness of 10 nm, a particle diameter of 500 nm, and a specific surface area of 900 m$^2$/g was added to the solution and dispersed therein. 1.5 wt % of carboxylmethyl cellulose, 1 wt % of Ketjenblack, 1 wt % of a Si active material, and 95 wt % of a graphite active material were added thereto to prepare a negative active material slurry.

The negative active material slurry was coated on a Cu foil, dried, and compressed to manufacture a negative electrode.

Example 2

A negative electrode was manufactured according to the same method as in Example 1 except that the negative active material slurry was prepared by adding 0.8 wt % of styrene-butadiene rubber to water and dissolving it therein, adding 0.7 wt % of montmorillonite having a thickness of 10 nm, a particle diameter of 500 nm, and a specific surface area of 900 m$^2$/g to the solution and dispersing it therein, and adding 1.5 wt % of carboxylmethyl cellulose, 1 wt % of Ketjenblack, 1 wt % of a Si active material, and 95 wt % of a graphite active material.

Comparative Example 1

A negative electrode was manufactured according to the same method as in Example 1 except that the negative active material slurry was prepared by adding 1.5 wt % of styrene-butadiene rubber to water and dispersing it therein, and adding 1.5 wt % of carboxylmethyl cellulose, 1 wt % of Ketjenblack, 1 wt % of a Si active material, and 95 wt % of a graphite active material.

Example 3

A negative electrode was manufactured according to the same method as in Example 1 except that the negative active material slurry was prepared by adding 1.2 wt % of styrene-butadiene rubber to water and dissolving it therein, adding 0.3 wt % of montmorillonite having a thickness of 10 nm, a particle diameter of 500 nm, and a specific surface area of 900 m$^2$/g to the solution and dispersing it therein, and then adding 1.5 wt % of carboxylmethyl cellulose, 1 wt % of Ketjenblack, 48 wt % of a Si active material, and 48 wt % of a graphite active material.

Example 4

A negative electrode was manufactured according to the same method as in Example 1 except that the negative active material slurry was prepared by adding 0.8 wt % of a styrene-butadiene rubber to water and dissolving it therein, adding 0.7 wt % of montmorillonite having a thickness of 10 nm, a particle diameter of 500 nm, and a specific surface area of 900 m$^2$/g to the solution and dispersing it therein, and then adding 1.5 wt % of carboxylmethyl cellulose, 1 wt % of Ketjenblack, 48 wt % of a Si active material, and 48 wt % of a graphite active material.

Comparative Example 2

A negative electrode was manufactured according to the same method as in Example 1 except that the negative active material slurry was prepared by adding 1.5 wt % of styrene-butadiene rubber to water and dissolving it therein, and adding 1.5 wt % of carboxylmethyl cellulose, 1 wt % of Ketjenblack, 48 wt % of a Si active material, and 48 wt % of a graphite active material.

Comparative Example 3

A negative electrode was manufactured according to the same method as in Example 1 except that the negative active material slurry was prepared by adding 0.8 wt % of styrene-butadiene rubber to N-methylpyrrolidone and dissolving it therein, adding 0.7 wt % of montmorillonite having a thickness of 10 nm, a particle diameter of 500 nm, and a specific surface area of 900 m$^2$/g to the solution and dispersing it therein, and adding 3 wt % of polyvinylidene fluoride, 1 wt % of Ketjenblack, 48 wt % of a Si active material, and 48 wt % of a graphite active material thereto.

*Manufacture of Battery Cells

Each negative electrode according to Examples 1 to 4 and Comparative Examples 1 to 3 was combined with a positive electrode using a LiNi$_{1/3}$Co$_{1/3}$Mn$_{1/3}$O$_2$ active material and an electrolyte solution to manufacture pouch-type battery cells. Herein, the electrolyte solution was prepared by dissolving 1.0 M LiPF$_6$ in a mixed solvent of ethylene carbonate and diethyl carbonate (50:50 volume ratio).

*Charge and Discharge Characteristics

The pouch-type battery cells were charged and discharged at a rate of 0.2 C, and their discharge capacities were measured and shown in Table 1.

*Cycle-Life Characteristics

The pouch-type battery cells were charged and discharged 100 times at a rate of 1 C/1 C. Their 100th discharge capacity/1$^{st}$ discharge capacity and 200th discharge capacity/1$^{st}$ discharge capacity ratios were calculated, and the results are shown in Table 1. In addition, the pouch-type battery cells were charged and discharged 200 times at a rate of 1 C/1 C, and then, their 200$^{th}$ discharge capacity/1$^{st}$ discharge capacity ratios were calculated, and the results are shown in Table 1.

*Binding Force

*The binding force between the current collector and a negative active material layer for each of the negative electrodes according to Examples 1 to 4 and Comparative Example 1 to 3 was measured using a tensile strength tester, and the results are shown in Table 1.

*Increase of Battery Thickness

The pouch-type battery cells were charged and discharged at a rate of 1 C/1 C, and the battery thickness ratios (%) was measured for each battery after 200 cycles with respect to its initial thickness. The results are shown in Table 1.

TABLE 1

| | 0.2 C discharge capacity (Ah) | Discharge capacity after 100 cycles (Ah) | Discharge capacity after 200 cycles (Ah) | Binding force (gf/mm) | Increase rate of battery thickness (%) |
|---|---|---|---|---|---|
| Example1 | 1 | 0.95 | 0.88 | 2.5 | 115 |
| Example2 | 1 | 0.97 | 0.9 | 6.5 | 110 |
| Comparative Example1 | 1 | 0.93 | 0.84 | 1.3 | 127 |
| Example3 | 1.2 | 0.85 | 0.72 | 1.7 | 123 |
| Example4 | 1.2 | 0.87 | 0.78 | 2.9 | 120 |
| Comparative Example2 | 1.2 | 0.82 | 0.6 | 0.8 | 140 |
| Comparative Example3 | 1.2 | 0.87 | 0.77 | 3 | 122 |

As shown in Table 1, Examples 1 and 2 including nanoclay compared with Comparative Example 1 including no nanoclay, and Examples 3 and 4 including nanoclay compared with Comparative Example 2 including no nanoclay showed comparatively high discharge capacities, excellent binding forces, and small battery thickness increases after 100 cycles and 200 cycles.

Examples 3 and 4 including an Si active material in an excessive (e.g., large) amount and using an aqueous binder showed similar capacity, binding force, and battery thickness increases as Comparative Example 3 using an organic binder. Accordingly, even when an Si active material is used in an excessive (e.g., large) amount, when nanoclay is used, an aqueous binder may be used. Thus, water is used as a solvent, and resultantly, a negative electrode using the aqueous binder including the nanoclay may not cause environmental pollution.

While this disclosure has been described in connection with what is presently considered to be practical example embodiments, it is to be understood that the present disclosure is not limited to the disclosed embodiments, but, on the contrary, is intended to cover various modifications and equivalent arrangements included within the spirit and scope of the appended claims and equivalents thereof.

What is claimed is:

1. A negative electrode for a rechargeable lithium battery, comprising:
a negative active material layer including a negative active material including a Si-based active material; nanoclay; and an aqueous binder; and
a current collector supporting the negative active material layer.

2. The negative electrode of claim 1, wherein the negative active material layer further includes a carbon-based active material.

3. The negative electrode of claim 2, wherein a weight ratio of the Si-based active material and the carbon-based active material is about 1:99 to about 99:1.

4. The negative electrode of claim 1, wherein an amount of the negative active material is about 82 wt % to about 99.7 wt % based on a total amount (100 wt %) of the negative active material layer.

5. The negative electrode of claim 1, wherein an amount of the nanoclay is about 0.1 wt % to about 5 wt % based on a total amount (100 wt %) of the negative active material layer.

6. The negative electrode of claim 1, wherein an amount of the aqueous binder is about 0.1 wt % to about 10 wt % based on a total amount (100 wt %) of the negative active material layer.

7. The negative electrode of claim 1, wherein the nanoclay is exfoliated into a nano phase and positioned as a filler between molecular chains of the aqueous binder in the negative active material layer.

8. The negative electrode of claim 1, wherein the nanoclay is montmorillonite, smectite, bentonite, laponite, hectorite, gibbsite, chlorite, kaolinite, halloysite, pyrophylite talc, vermiculite, illite, mica, brittle mica, or a combination thereof.

9. The negative electrode of claim 1, wherein the aqueous binder is a styrene-butadiene rubber, an acrylated styrene-butadiene rubber (SBR), an acrylonitrile-butadiene rubber, an acrylic rubber, a butyl rubber, a fluorine rubber, polytetrafluoroethylene, polyethylene, polypropylene, an ethylenepropylene copolymer, polyethyleneoxide, polyvinylpyrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, or a combination thereof.

10. The negative electrode of claim 1, wherein the nanoclay has a thickness of about 1 nm to about 10 nm and a diameter of 100 nm to about 1000 nm.

11. A rechargeable lithium battery, comprising:
the negative electrode of claim 1;
a positive electrode including a positive active material; and
an electrolyte.

12. The negative electrode of claim 1, wherein the nanoclay is gapped, and molecular chains of the aqueous binder are intercalated between layers of the gapped nanoclay.

* * * * *